United States Patent Office 3,457,725
Patented July 29, 1969

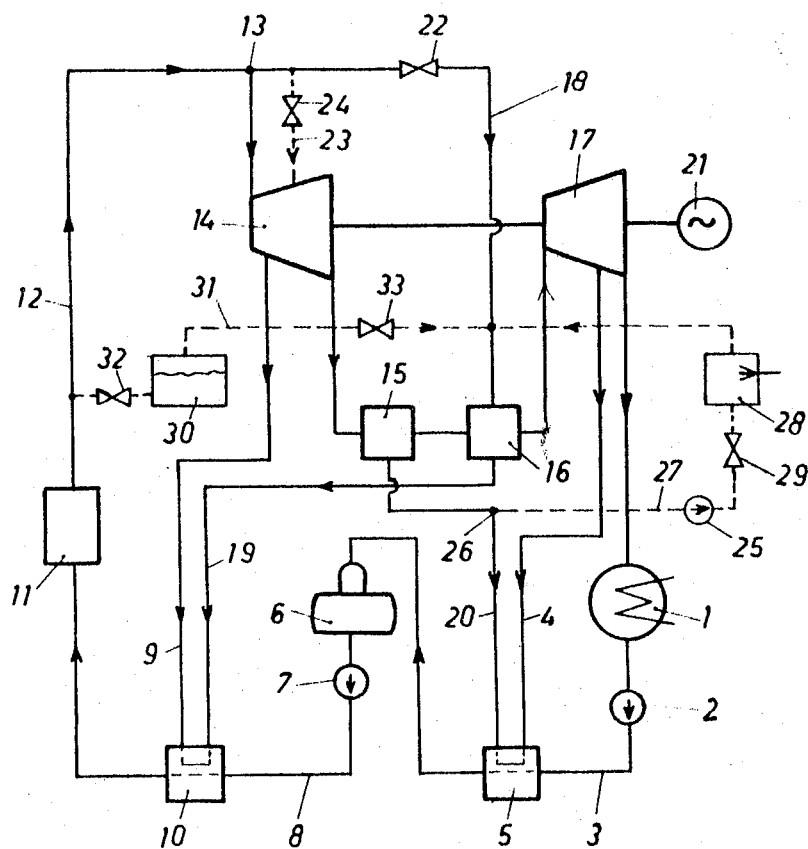

3,457,725
APPARATUS FOR COVERING A PEAK LOAD OR A RAPIDLY CHANGING LOAD IN A STEAM TURBINE PLANT
Alfred Schwarzenbach, Wettingen, Switzerland, assignor to Aktiengesellschaft Brown, Boveri & Cie, Baden, Switzerland, a joint-stock company
Filed Nov. 24, 1967, Ser. No. 685,357
Claims priority, application Switzerland, Jan. 5, 1967, 109/67
Int. Cl. F01k 7/16, 3/14
U.S. Cl. 60—73
5 Claims

ABSTRACT OF THE DISCLOSURE

A steam turbine installation wherein heat for the high and low pressure sections of the turbine is furnished by nuclear energy and wherein for covering peak loads, or rapidly increasing loads, secondary steam current branched off the main steam supply in advance of the high pressure section and normally used for superheating the steam after the latter has been passed through a water separator interposed between the high and low pressure sections of the steam turbine—is at least partially made use of by introducing it directly into the high pressure turbine section for the production of power.

---

This invention relates to a device for covering peak load or a rapid load variation in a steam turbine installation heated by nuclear energy and consisting at least of high- and low-pressure sections, whose working steam traverses, after leaving the high-pressure section, first a water separator and then an intermediate superheater, in which at normal operation it is superheated by a secondary steam current branched off from the main steam current before the high-pressure section of the steam turbine.

By peak load is understood a load in a power plant occurring for instance once or twice daily and only for a short time, which goes beyond the maximum possible overload that the plant is able to manage. To cover the peak load either a power engine must be used which is put into operation only for this purpose, or a special device must be provided in order to be able to produce more power temporarily.

In steam turbine installations, tne steam turbine itself can be used for peak load coverage by modifying the layout of the steam or feed water conduction, and this requires relatively little additional apparatus cost. The resulting reduction in thermal efficiency is accepted, since it occurs only briefly. For this, several methods are known:

Disconnection of a high-pressure feed water preheater or of a preheater group;

Introduction of the live steam or of the intermediately superheated steam into a lower stage than in normal operation (Cl. Seippel, Report 104 to World Power Conference in Lausanne, 1964);

Replacement of the steam to be fed in the high-pressure feed water preheater by steam from a heat accumulator (German Patents 434,119 and 687,969);

Replacement of the bleeder steam heat to be fed in the high-pressure feed water preheater by the exhaust gas heat of a gas turbine (French Patent 1,396,379) or by an auxiliary burner (Report to the World Power Conference Lausanne 1964, vol. VI, pp. 3086–87).

If a steam turbine installation is heated by a nuclear reactor, it is laid out, for reasons of economy, in such a way that it just suffices for the anticipated overload. Beyond that it offers no reserves. If the coverage of peak load is required, the first two of the above-mentioned methods are not applicable, because they call for an increased heat supply from the reactor. The last two methods would, in principle, be possible for heating by nuclear energy, but there results a major disadvantage. The steam generated by a reactor is usually saturated or only slightly superheated, since as high as possible a starting pressure is desired. Hence, there prevails already in the high-pressure section of the turbine a relatively high proportion of water in the steam, which is let out at least in part with the bleeder steam. Now if the bleedings are stopped, dewatering no longer occurs, unless additional devices are provided, and the blading is endangered by the water drops. In addition, for the two last-named methods very large additional heat exchangers are necessary, as the entire feed water quantity must be heated up.

In the nuclear reactors known today, the possible rate of variation of the thermal power is limited. They can still absorb a small load jump of for example 10%, but they are unable to follow a greater rapid load increase even within the normal operation range. For this, other means must be used temporarily and the reactor must be readjusted slowly.

The problem underlying the invention is to use a steam turbine installation heated by nuclear energy, avoiding the mentioned disadvantages and difficulties and without higher thermal power of the reactor, also for peak load or at rapidly increasing load. According to the invention, this problem is solved in that at peak load, or rapid load increase, the secondary steam current branched from the main steam current before the high-pressure section of the steam turbine is made use of at least partially for the direct power output. To carry out this method, an adjustable throttle member in the secondary steam line is used, upon actuation of which in a closing direction the secondary steam current flows at least partially toward the high-pressure section of the steam turbine.

The invention is further explained below with reference to an example. In the one and only figure of the accompanying drawing a steam turbine installation is shown diagrammatically with the structural elements necessary for comprehension of the invention.

The feed water collected in the condenser 1 is conducted by the condensation pump 2 through line 3 via the low-pressure feed water preheater 5 heated with bleeder steam from line 4, into the feed water tank 6; then further by the boiler feed pump 7 through line 8 via the high-pressure feed water preheater 10 heated with bleeder steam from line 9 into the structural element 11, by which must be understood a nuclear reactor or a heat exchanger lying in the primary cycle of such a reactor. The issuing main steam current is conducted through line 12 to the divisional point 13. The working steam enters the high-pressure section 14 of the steam turbine and, after leaving it, is passed first, because of the water content, into the water separator 15 and subsequently into the intermediate superheater 16, before it enters the low-pressure section 17 of the steam turbine and later the condenser 1.

The secondary steam current branching off at 13 is conducted through line 18 into the intermediate superheater 16, where by emission of heat it superheats the working steam. Its condensate is conducted through line 19 into the high-pressure feed water preheater 10, where it takes over a part of the heating of the feed water. For the same purpose, the condensate obtained in the water separator 15 is conducted through line 20 into the low-pressure feed water preheater 5.

It should be pointed out here that naturally there may be provided not only individual feed water preheaters, but whole groups. The high- and low-pressure sections of the steam turbine are coupled with the electric generator 21.

The scheme of a steam turbine installation with heating by nuclear energy as described thus far is known. At slowly increasing load, the high-pressure inlet valve (not shown) is opened until the upper limit of absorption capacity and hence of loadability of the turbine in normal operation is reached. A load beyond this limit of power on the installation is therefore not possible. Likewise, as has been mentioned above, in the normal operation range, a rapid load increase is possible only in a small extent because of the limited rate of variation of the thermal reactor output.

This is where the present invention comes in. Upon the occurrence of a peak load or sudden higher power requirement, the secondary steam current conducted to the intermediate superheater 16 in normal operation is throttled by means of valve 22 or shut off entirely. It is thus available at least in part for the high-pressure section 14 of the steam turbine, whose output thereby increases rapidly and it is made use of in this manner for direct power output.

If, due to the rapid load increase, the given overload limit is not exceeded, the steam turbine can readily handle also the secondary steam quantity flowing to it, as its absorption capacity is sufficient. The reactor is readjusted, and an increasing partial quantity of the secondary steam current again flows to the intermediate superheater 16. At peak load, however, the necessary total steam quantity—full working steam quantity and entire, or partial, quantity of the secondary steam current—exceeds the absorption capacity of the turbine. Therefore, a connecting line 23 to the high-pressure section 14 of the steam turbine, branching off from the secondary steam line 18, is provided, which is controlled by an adjustable throttle valve 24. This valve is opened as soon as the coverage of peak load is demanded.

In principle, the secondary steam current could be introduced also into the low-pressure section 17 of the steam turbine, but this would be too great a devaluation of the steam flowing in under full initial pressure. The most economic way is to introduce the secondary steam current into one of the first stages of the high-pressure section, in order that it will traverse as many of the subsequent stages as possible.

If, at peak load or a rapid load increase in the normal operating range, the power gain which results from the introduction of the total secondary steam current into the steam turbine is not sufficient to cover the sudden high power requirement, one of the additional devices described below with reference to the drawing, as an example, is required.

The condensate obtained in the water separator 15, which may amount to about 15% of the working steam quantity and which in normal operation is supplied to the low-pressure feed water preheated 5, is then pumped off by the boiler feed pump 25 through line 27 branching off at 26 and supplied to the auxiliary boiler 28 for feeding, is evaporated there and then introduced into line 18 to admit it to the intermediate superheater 16. Line 18 is shut off by valve 22, and the secondary steam-current is introduced into the high-pressure section 14 of the steam turbine. The steam obtained in the auxiliary boiler 28 thus takes over the function of the secondary steam current, which now serves for power increase.

The condensate supplied to the auxiliary boiler may alternatively be derived from the cycle of the steam turbine at another point, e.g. after the boiler feed pump 7; this would have the advantage that no special pump would be needed for the feed of the auxiliary boiler, but would be worse thermodynamically since colder water would have to be evaporated.

The auxiliary boiler 28 may be fired with any fossil fuel, or it may be heated with the exhaust gases of a gas turbine if such exists already, for example, for emergency current supply or for peak load coverage. In any event, the steam output of the auxiliary boiler should be controllable, to be able to compensate load fluctuations in this way. To prevent, that when the auxiliary boiler is taken out of operation, a portion of the secondary steam current passes through line 27 into the low-pressure feed water preheater, a shut-off valve 29 is provided.

Another possibility for brief coverage of high power requirement consists in admitting the intermediate superheater 16 with steam from a heat accumulator 30, which is charged from the main steam current during the low-load operating periods. For this purpose it is connected via line 31 with line 12 on the one hand, and with line 18 on the other. Charging and discharging of the accumulator are regulated by the throttle valves 32 and 33. Here also valve 22 is closed during discharging of the accumulator, and the secondary steam current is introduced into the high-pressure section of the steam turbine. This device is suitable especially for steam turbine installations heated by pressure water reactors (PWR) because in this case they have a greatly increased live steam pressure at low load.

Due to the throttling or complete shutting off of the secondary steam current, the working steam current is superheated little or not at all in the intermediate superheater, owing to which there occurs a stronger erosion by water droplets, especially in the last stages of the low-pressure section of the turbine. This phenomenon is of no importance when a rapid load increase within the load range of the turbine is concerned, as it disappears by readjustment of the reactor and thus occurs only briefly. The situation is similar at peak load if peak load occurs for only half an hour per work day. This is about 1250 hours in ten years, or 1.5% of 80,000 hours of normal operation time, an acceptable figure with respect to erosion. But if a longer lasting daily peak load must be expected during which the entire secondary current is introduced into the steam turbine, then the described additional devices for the admission of the intermediate superheater prove an effective measure to restrict erosion.

By the present invention, the relatively small speed of variation of the output of the steam turbine installations known today, heated by nuclear energy, which until now could be used almost only for basic load operation, is at least partially compensated. At variance with the initially mentioned possibilities of peak load coverage by a conventional steam turbine, the proposed measures concern only a partial quantity of the working medium, and accordingly the necessary additional equipment costs are small and control is less sluggish. It is thus possible to use in the future also steam turbine installations heated by nuclear energy for covering peak load or a rapid load increase.

I claim:

1. In a steam turbine installation wherein heat for the high and low pressure sections of the turbine is furnished by nuclear energy, and wherein a water separator and an intermediate superheater are interposed between and traversed by the steam in passing from the high to the low pressure sections of the turbine, said intermediate superheater being normally supplied with a secondary steam current from a line branched off from the main steam supply line in advance of its admission to said high pressure section, the improvement wherein for covering peak loads and rapidly increasing loads, means are provided for introducing at least a part of said secondary steam current into an intermediate stage of said high pressure section of said turbine and downstream of the main supply of steam to said high pressure section for the direct production of power.

2. A steam turbine installation as defined in claim 1 and which includes a throttle valve in said secondary steam line, movement of said throttle valve towards its closed position serving to force more of the total steam quantity through said high pressure section of said turbine.

3. A steam turbine installation as defined in claim 1 which includes a first throttle valve in said secondary steam line, said means for introducing a part of said secondary steam including an auxiliary steam introduction line into said high pressure section of said turbine intermediate said branch-off point for said secondary steam line and said throttle valve, and a second throttle valve in said auxiliary steam introduction line for controlling the quantity of steam flowing from said secondary steam line directly into said high pressure section of said turbine.

4. A steam turbine installation as defined in claim 1 and which includes a throttle valve in said secondary steam line, movement of said throttle valve towards its closed position serving to force more of the total steam quantity through said high pressure section of said steam turbine, and which further includes an auxiliary boiler, means feeding the boiler with condensate from the water separator, and means supplying steam from said auxiliary boiler to said intermediate superheater.

5. A steam turbine installation as defined in claim 1 which includes a throttle valve in said secondary steam line, movement of said throttle valve towards its closed position serving to force more of the total steam quantity through said high pressure section of said steam turbine, and which further includes a heat accumulator, means for charging said heat accumulator from the main steam current in advance of the high pressure section of said steam turbine during low-load operating periods, and means connecting said heat accumulator to said intermediate superheater to supply steam thereto.

References Cited

UNITED STATES PATENTS 3,129,564    4/1964    Brunner _____ 60—73 X

CARROLL B. DORITY, JR., Primary Examiner

U.S. Cl. X.R.

60—67, 104